United States Patent [19]
Lim

[11] Patent Number: 6,068,248
[45] Date of Patent: May 30, 2000

[54] POWER PLANT MOUNTING BUSH

[75] Inventor: Seung-Ho Lim, Kyungki-do, Rep. of Korea

[73] Assignee: Hyundai Motor Company, Seoul, Rep. of Korea

[21] Appl. No.: 08/994,034

[22] Filed: Dec. 18, 1997

[30] Foreign Application Priority Data

Dec. 19, 1996 [KR] Rep. of Korea ............ 96-67801

[51] Int. Cl.⁷ ...................................................... F16F 5/00
[52] U.S. Cl. ................................. 267/140.12; 310/51
[58] Field of Search .......................... 267/136, 140.12, 267/140.15, 276, 293; 310/51; 248/562, 636, 638

[56] References Cited

U.S. PATENT DOCUMENTS

| | | | |
|---|---|---|---|
| 4,583,503 | 4/1986 | Kumagai et al. | 123/192 R |
| 4,583,723 | 4/1986 | Ozawa | 267/140.1 |
| 4,754,956 | 7/1988 | Barone et al. | 267/140.1 |
| 5,154,403 | 10/1992 | Sato | 267/141.2 |
| 5,226,500 | 7/1993 | Doi et al. | 267/140.12 X |

*Primary Examiner*—Robert J. Oberleitner
*Assistant Examiner*—Pamela J. Lipka
*Attorney, Agent, or Firm*—Christie, Parker & Hale, LLP

[57] ABSTRACT

A power plant mounting bush according to the present invention includes a rubber insulator 16 having a pair of holes 13 opposing each other from the center of an inner pipe 11, wherein the rubber insulator 16 is installed at a circular bracket 25 with a bearing 20 therebetween so that the rubber insulator 16 can be freely revolved in the bracket 25 and a plurality of electromagnets 26 are disposed along an inner surface of the bracket 25 each disposed at predetermined spaces with a plurality of electromagnets 15 also formed at an outer pipe 14 of the rubber insulator 16, whereby a control unit 30 selectively applies electric current to the electromagnets 15 and 26 so that attracting force or repulsing force is selectively acted between the electromagnets 15 of the rubber insulator 16 and the electromagnets 26 of the bracket 25 in order to rotate the rubber insulator 16 by a predetermined angle in the bracket 25.

3 Claims, 2 Drawing Sheets

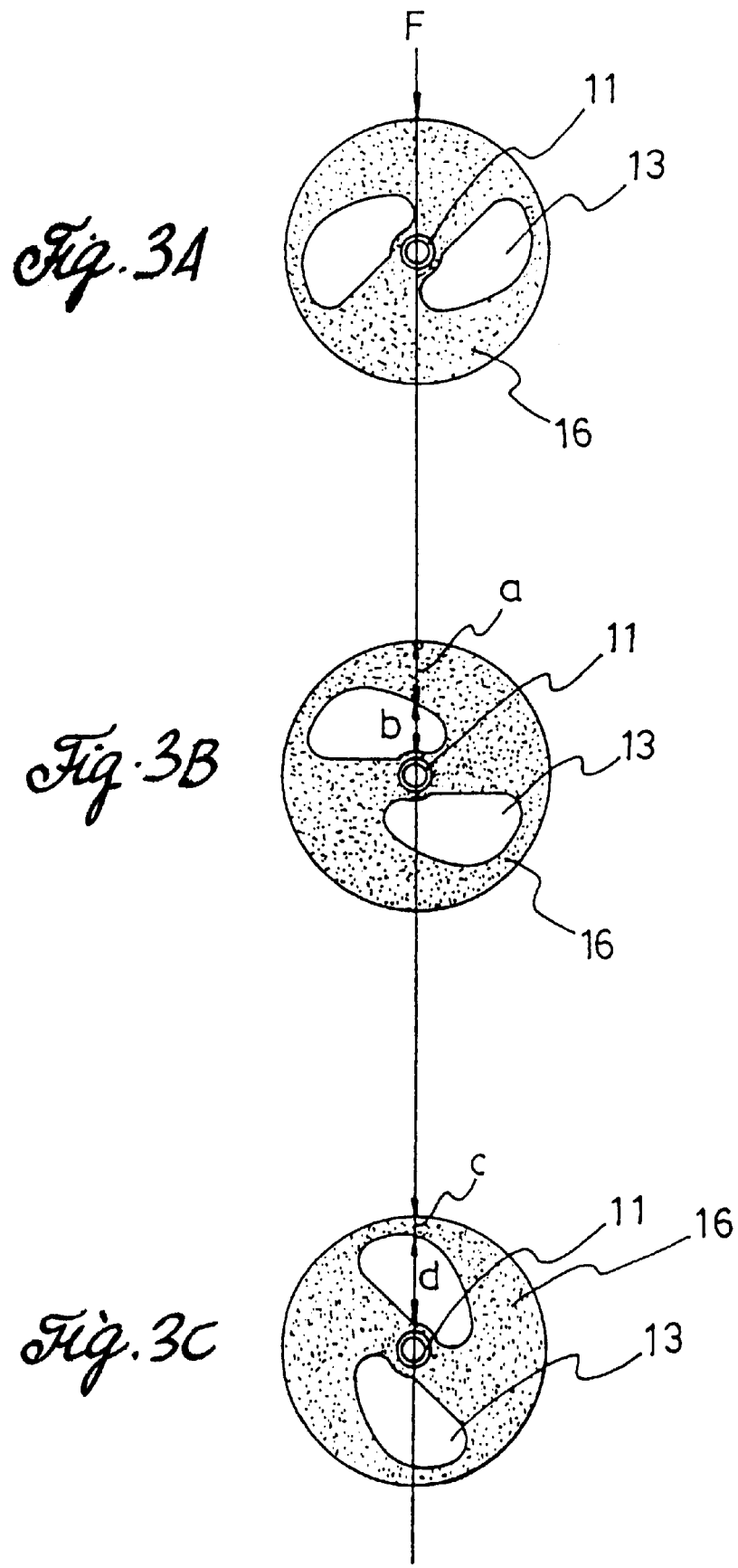

POWER PLANT MOUNTING BUSH

BACKGROUND OF THE INVENTION

1. Field of the Invention

This invention relates to a power plant mounting bush which can be revolve automatically according to engine vibration conditions to show different damping characteristics.

2. Description of the Prior Art

An automobile the engine produces power by movement of pistons, connecting rods and a crank shaft. Weight center of engine continues to be changed periodically by vertical movement of pistons and connecting rods owing to structural reason of an engine. Since inertial force according to piston's reciprocal movement, inertial force according to connecting rods' movement lateral to the crankshaft and rotational force applied to the crankshaft are periodically changed, there are generated vertical and horizontal vibrations in the engine.

Such vibrations are rather severe in an engine having fewer cylinders, and the vibrations have relatively high amplitude at a low speed of the engine but relatively low amplitude at a high speed of the engine according to the engine speed. An engine is normally supported by a chassis or a body of a vehicle together with a transmission and/or a clutch, on which the engine or a power plant (general term indicating assembly of engine, transmission and/or clutch) is mounted by elastic mounting means therebetween for absorbing such vibrations in order to prevent vibrations of the engine from being transmitted to the chassis or body not to hinder passenger comfort. Such mounting means is generally called as engine mount, power plant mount, etc.

Types of engine mounts or power plant mounts are divided into a rubber mount with a rubber insulator and a hydraulic mount including hydraulic fluid within a rubber insulator according to their materials or structure, and are also divided into a flat-type mount for supporting a lower surface of the engine or the power plant and a bush-type mount for supporting torque roll shaft according to their utility.

The most important factor considered in design of the engine mount or the power plant mount is the damping characteristics of an insulator. Generally the engine mount requires a high damping value against high amplitude vibrations for rapidly absorbing engine shocks and also needs to have a low damping value but a high spring constant against the low amplitude vibrations in order to reduce the indoor noise of a vehicle.

FIG. 1 shows a conventional rubber typed power plant mounting bush.

As shown, the conventional power plant mounting bush 1 includes an inner pipe 2 centrally mounted thereon and a rubber insulator 4 formed therearound and having two holes 3 at the upper and lower parts thereof. The rubber insulator 4 has a changing rubber-space rate toward its diagonal directions according to its shape, so as to provide a different damping value and a different spring constant toward its radial directions, respectively. However, the rubber type power plant mount 1 is installed conventionally and fixedly considering vibrational average forces applied thereto to show constant damping and elastic characteristics regardless of amplitude or frequency of applied vibrational force F toward respective radial directions.

However, a power plant mounting bush having such constant characteristics could not meet requirements of ever-progressing low indoor noise and high comforts, because vehicle vibrations are vary in amplitude and frequency in accordance with engine speed even in the same direction.

Accordingly, it is an object of the present invention to provide a power plant mounting bush whose insulator damping characteristics can be changed according to vehicle speed.

SUMMARY OF THE INVENTION

The above and other objects are achieved according to the invention of a power plant mounting bush, the bush comprising:

a rubber insulator having an inner pipe and opposing holes whose outer curve is changing in radius from the center of an inner pipe; and a revolving device for revolving the rubber insulator.

Further, the invention provides a power plant mounting bush in which the holes at the insulator are symmetrically formed around the center of the inner pipe, where the outer curve of the holes at the rubber insulator is an involute curve.

Further, the invention provides a power plant mounting bush in which the revolving device is a multi-stage driving type revolving device for rotating the rubber insulator in multi-stages at predetermined angles.

The invention provides a power plant mounting bush wherein the revolving device comprises:

a circular bracket supporting the rubber insulator therein;

a bearing installed between the bracket and the rubber insulator; and a plurality of electromagnets arranged circumferentially at spaces at an outer pipe of the rubber insulator and at an inner surface of the circular bracket, respectively.

The invention provides a power plant mounting bush in which the revolving device is controlled by a control unit in response to engine revolution per minute (R.P.M.).

Therefore, the invention can provide various damping characteristics by using a simple rubber insulator and a revolving device, so that it can show proper damping effects according to engine R.P.M. to contribute reduction of engine noise.

BRIEF DESCRIPTION OF THE DRAWINGS

For fuller understanding of the nature and objects of the invention, reference should be made to the following detailed description taken in conjunction with the accompanying drawings in which:

FIGS. 3A, 3B and 3C are revolved conditions of the rubber insulator of the invention respectively at a low engine speed, at an intermediate speed and at a high speed.

DESCRIPTION OF THE PREFERRED EMBODIMENTS

The preferred embodiments of the present invention will now be described in detail with reference to the accompanying drawings.

Figure 1:
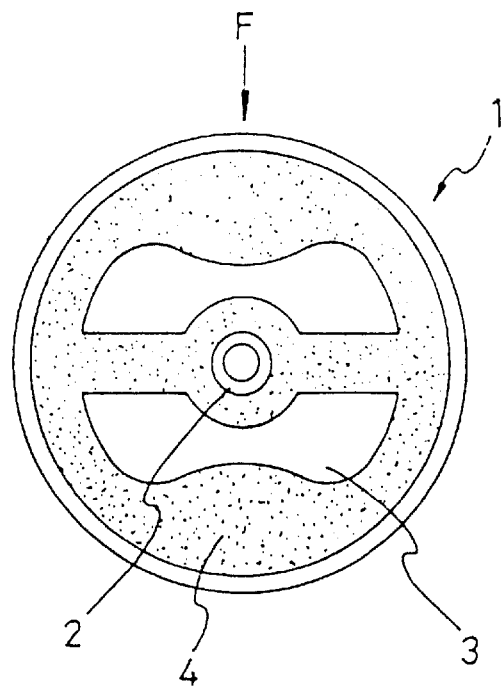
FIG. 1 is a plan view of a conventional power plant mounting bush.
Figure 2:
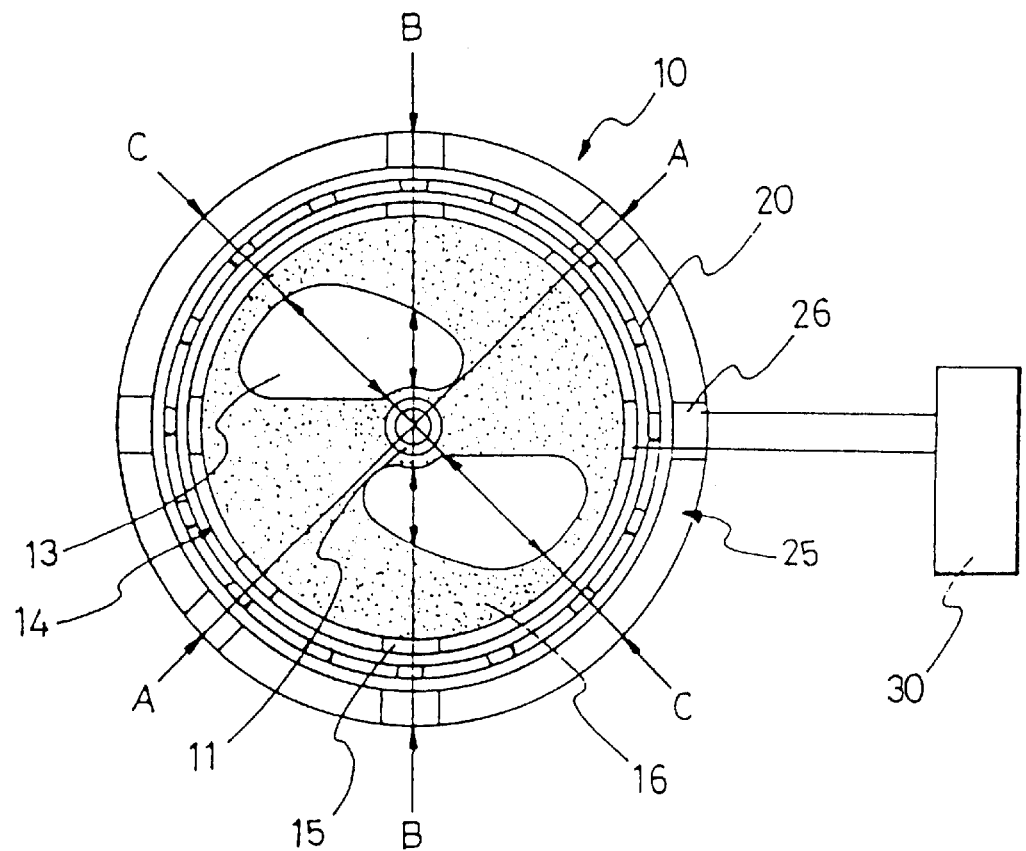
FIG. 2 is a plan view of a power plant mounting bush according to the present invention.

FIG. 2 shows a structure of a power plant mounting bush 10 according to the present invention.

As shown, a power plant mounting bush 10 according to the present invention includes a rubber insulator 16 having a pair of holes 13 opposing each other from the center of an inner pipe 11. The outer curve of the holes 13 has a curve changed continually in radius from the center, such as an involute curve. The holes 13 at the insulator are symmetrically formed around the center of the inner pipe 11. The rubber insulator 16 is installed at a circular bracket 25 through a bearing 20 therebetween so that the rubber insulator 16 can be revolved freely within the bracket 25.

A revolving device for rotating the rubber insulator 16 can be constructed variously, and FIG. 2 illustrates an embodiment using a plurality of electromagnets for making the rubber insulator 16 revolve, which is supported by the bearing 20 for free revolution. That is, a plurality of electromagnets 26 are disposed along an inner surface of the bracket 25, each being located at a predetermined space. And a plurality of electromagnets 15 are also formed at an outer pipe 14 or attached to an outer surface of the outer pipe 14 of the rubber insulator 16. A control unit 30 selectively applies electric current to electromagnets 15 and 26 so that attracting force or repulsing force is selectively acted between the electromagnets 15 of the rubber insulator 16 and the electromagnets 26 of the bracket 25 to thereby rotate the rubber insulator 16 at a predetermined angle.

However, the revolving device for the rubber insulator 16 can be constructed variously except for the above-mentioned structure, for example, by using a gear mechanism together with a gear driving device such as a motor.

Therefore, the revolving device of the present invention should not be restricted to the device shown in FIG. 2.

Operations of the power plant mounting bush 10 according to the present invention will now be explained with reference to FIG. 3.

FIGS. 3A, 3B and 3C show revolved conditions of rubber insulator 16 respectively at high speed, at intermediate speed and at a low speed of the engine R. P. M. These three stage revolutions correspond to A, B and C indicated in FIG. 2. Therefore, each represents a condition that the rubber insulator 16 has been revolved at one of the three stages by electromagnets and 26 each being spaced at predetermined interval therebetween so that a respective position indicated by an arrow in FIG. 2 is oriented to a direction to which the force F is applied.

FIG. 3A shows a stage in which the high stiffness portion of the rubber insulator 16 is directed against the applied force F in which the stage is suitable for high amplitude vibrations at a low engine speed. At this stage, the rubber insulator 16 shows a low spring constant corresponding to spring modulus of rubber and high damping characteristics, since a rubber-filled portion of the rubber insulator 16 is directed to a direction to which the force F is applied.

Meanwhile, when an engine speed reaches an intermediate R.P.M., the control unit 30 rotates the rubber insulator 16 at a predetermined angle, where a diagonal position mixed with a ratio of rubber portion a and a space portion b is oriented to the force F applied. Therefore, the rubber insulator 16 shows an increased spring constant and lower damping characteristics by the above rubber-space ratio.

Meanwhile, when the engine speed arrives at a high speed and goes under a low amplitude vibration condition, the control unit 30 rotates the rubber insulator 16 at a predetermined angle. FIG. 3C shows the rubber insulator 16 thus rotated and a rubber portion c becomes less in thickness thereof than the space portion d in the stage, so that the spring constant is increased while damping characteristics are decreased to the lowest condition to reach a highest spring constant condition. However, the conditions thus described have illustrated the most prominent 3 stages of the rubber insulator 16 and for illustrating purposes only. It is preferable to provide a multi-stage power plant mounting bush having more than 3 stages which are selected by the control unit 30 so that the power plant mounting bush 10 can provide a more effective and precise damping force and spring constant at each stage in response to vibrations according to the engine speeds.

It should be noted, therefore, that the number of stages of the aforementioned rubber insulator is for illustrative purposes only and should not restrict the invention thereto.

Accordingly, the invention can provide various damping characteristics by using a simple rubber insulator 16 and a revolving device, so that it can show proper damping effects in response to engine speed to contribute to reduction of engine noise.

Numerous modifications and variations of the present invention are possible in light of the above teachings. It is therefore to be understood the invention is defined by the scope of the appended claims, and the invention may be practiced in ways other than those in the intent and teachings of the invention.

What is claimed is:

1. A power plant mounting bush, the bush comprising:
   a rubber insulator having an inner pipe, an outer pipe and opposing holes whose outer curves are changing in radius from the center of the inner pipe; and
   a revolving device having:
   a circular bracket supporting the rubber insulator therein;
   a bearing installed between the circular bracket and the rubber insulator; and
   a plurality of electromagnets circumferentially arranged within spaces at the outer pipe of the rubber insulator and at an inner surface of the circular bracket, respectively;
   wherein the revolving device is a multi-stage driving type revolving device for rotating the rubber insulator in multi-stages at predetermined angles.

2. The bush as claimed in claim 1 wherein the revolving device is controlled by a control unit in response to engine R.P.M.

3. The bush as claimed in claim 1 wherein the opposing holes are symmetrical to each other and the outer curves of the opposing holes of the rubber insulator are an involute curve.

* * * * *